(12) United States Patent
Lee (10) Patent No.: US 12,024,447 B2
(45) Date of Patent: Jul. 2, 2024

(54) MAGNETIZED WATER GENERATOR

(71) Applicants: POSEION CO., LTD., Bucheon-si (KR); Sang Hun Lee, Incheon (KR)

(72) Inventor: Sang Hun Lee, Incheon (KR)

(73) Assignees: POSEION CO., LTD., Bucheon-si (KR); Sang Hun Lee, Incheon (KR)

( * ) Notice: Subject to any disclaimer, the term of this patent is extended or adjusted under 35 U.S.C. 154(b) by 368 days.

(21) Appl. No.: 17/606,095

(22) PCT Filed: May 13, 2020

(86) PCT No.: PCT/KR2020/006284
§ 371 (c)(1),
(2) Date: Oct. 25, 2021

(87) PCT Pub. No.: WO2020/231174
PCT Pub. Date: Nov. 19, 2020

(65) Prior Publication Data
US 2022/0194825 A1 Jun. 23, 2022

(30) Foreign Application Priority Data
May 15, 2019 (KR) .................. 10-2019-0056891

(51) Int. Cl.
 C02F 1/48 (2023.01)
 B03C 1/28 (2006.01)
 B05B 1/18 (2006.01)
 B05B 15/40 (2018.01)
(52) U.S. Cl.
 CPC ............... *C02F 1/48* (2013.01); *B03C 1/286* (2013.01); *B05B 1/18* (2013.01); *B05B 15/40* (2018.02); *C02F 1/481* (2013.01); *C02F 2303/04* (2013.01); *C02F 2303/22* (2013.01); *C02F 2307/06* (2013.01)

(58) Field of Classification Search
 CPC ....... C02F 2307/06; B03C 1/286; B05B 1/18; B05B 15/40
 See application file for complete search history.

(56) References Cited

FOREIGN PATENT DOCUMENTS

| KR | 10-1029159 B1 | | 4/2011 |
|---|---|---|---|
| KR | 101029159 B1 | * | 4/2011 |
| KR | 10-1442756 B1 | | 9/2014 |
| KR | 101442756 B1 | * | 9/2014 |
| KR | 10-1651498 B1 | | 8/2016 |
| KR | 10-1727523 B1 | | 5/2017 |

(Continued)

OTHER PUBLICATIONS

International Search Report for PCT/KR2020/006284 mailed Sep. 10, 2020 from Korean Intellectual Property Office.

*Primary Examiner* — Liam Royce
(74) *Attorney, Agent, or Firm* — Revolution IP, PLLC (57) ABSTRACT

A magnetized water generator, includes: a housing portion having a cylindrical structure; a first magnetized water generating unit located on an upper side in the housing portion and rotating in a forward or counterclockwise direction by water flowing into the housing portion; and, a second magnetized water generating unit 300 located on an intermediate position in the housing portion, wherein the second magnetized water generating unit is separated from the first magnetized water generating unit by a barrier and wherein the second magnetized water generating unit rotates in a reverse or clockwise direction.

8 Claims, 6 Drawing Sheets

(56) References Cited

FOREIGN PATENT DOCUMENTS

| | | | |
|---|---|---|---|
| KR | 101727523 | B1 * | 5/2017 |
| KR | 10-1750226 | B1 | 6/2017 |
| KR | 10-2018-0047272 | A | 5/2018 |

* cited by examiner

MAGNETIZED WATER GENERATOR

TECHNICAL FIELD

The present invention relates to a magnetized water generator, and more particularly, to a magnetized water generator capable of performing a first stage magnetization while rotating water in a forward direction and a second stage magnetization while rotating water in a reverse direction in a successive manner, so that the magnetization efficiency could be improved.

BACKGROUND OF THE INVENTION

In general, the term "magnetization" means a phenomenon in which an object becomes to have magnetism, but magnetized water does not mean that water itself has magnetism.

In other words, magnetized water means that the arrangement of water molecules is changed by a magnetic field, so that magnetized water becomes to have a different molecular structure from normal water, wherein water molecules with polarities ($H^+/OH^-$) are changed to have a unique structure by magnetic fields, while water molecules usually decompose and bond in $1/100$ billionth of a second.

On the other hand, the magnetic field lines of the magnetic field come from the N pole and lead to the S pole, and when water passes through this magnetic field at a right angle, an electromotive force is generated at a right angle due to the direction of the enormous magnetic field lines, so that it causes micro currents to flow. At this time, water molecules are usually attached to each other to form a cluster.

In this state, if a superposed magnetic field is formed from a higher speed rotation, hydrogen ions with positive polarity and hydroxide ions with negative polarity adheres to each other, so that it causes the movements of water molecules, such as rotation and vibration, and thus, water molecules are atomized and ions are activated.

Accordingly, the magnetized water generator is to magnetize water molecules by using the principle that water molecules become smaller as the hydrogen ions and hydroxide ions go through the process of separation and recombination when water passes through a magnetic field. It produces a sterilization effect by refinement of water molecules and it provides the effect of removing scale or rust from water pipes, etc.

Therefore, when water is passed through the magnetic field of a magnet, the molecular structure of water is ion-activated to change water into magnetized water having a hexagonal structure, and a magnetized water generator using such a magnet is widely used in the field of domestic water.

However, since the conventional magnetized water generator is such that the magnetization is performed simply by magnets while passing water there-through instantaneously, there is little opportunity for water to be exposed to a magnetized space. Consequently, there is a problem in that the magnetization efficiency is greatly reduced.

DETAILED DESCRIPTION OF THE INVENTION

Object of the Invention

Therefore, it is an object of the present invention to provide a magnetized water generator which performs a first-stage magnetization while rotating water in the forward direction, and then performs a second-stage magnetization while rotating water in the reverse direction in a continuous manner after water passes through a barrier, so that it can improve magnetization efficiency.

On the other hand, the object of the present invention is not limited to the object mentioned above, and other objects not mentioned will be clearly understood by those skilled in the art from the following description.

SUMMARY OF THE INVENTION

According to the present invention, a magnetized water generator is provided, comprising: a housing portion having a cylindrical structure; a first magnetized water generating unit located on an upper side in the housing portion and rotating in a forward or counterclockwise direction by water flowing into the housing portion so as to magnetize water; and, a second magnetized water generating unit located on an intermediate position in the housing portion, wherein the second magnetized water generating unit is separated from the first magnetized water generating unit by a barrier and wherein the second magnetized water generating unit rotates in a reverse or clockwise direction so as to magnetize the water that has been magnetized by the first magnetized water generating unit and has passed through said barrier.

It is preferable that the housing portion comprises: an upper case that provides an upper space for accommodating the first magnetized water generating unit and that allows water to flow into the upper space from an outside; an intermediate case coupled to a lower part of the upper case and providing an intermediate space for accommodating the second magnetized water generating unit while being separated from the first magnetized water generating unit, wherein water magnetized by the first magnetized water generating unit flows from the upper case into the intermediate space; and a lower case coupled to a lower part of the intermediate case and providing a lower space that allows water magnetized by the second magnetized water generating unit to flow from the intermediate case into the lower space.

Also, it is preferable that the first magnetized water generating unit comprises: a first rotor located in the upper space of the upper case body and rotating in the forward or counterclockwise direction by water flowing into the upper space through the upper opening; and, a first magnetizing member located within the first rotor and rotating while the first rotor rotates, so as to magnetize the water that has been introduced and temporarily stored in the upper space.

Also, it is preferable that the second magnetized water generating unit comprises: a second rotor located in an intermediate space of the intermediate case body and rotating in the reverse or clockwise direction by water introduced into the intermediate space through the intermediate opening; and, a second magnetizing member located within the second rotor and rotating while the second rotor rotates, so as to magnetize the water that has been introduced and temporarily stored in the intermediate space.

Advantages of the Invention

According to the present invention, the magnetization efficiency can be improved by performing a first-stage magnetization while rotating water in a forward direction and performing a second-stage magnetization while rotating water in a reverse direction in a continuous manner.

On the other hand, the advantage of the present invention is not limited to the advantage mentioned above, and other advantages not mentioned will be clearly understood by those skilled in the art from the recitations in the claims.

DETAILED DESCRIPTION OF THE INVENTION

Hereinafter, a preferred embodiment of the present invention will be described in detail with reference to the accompanying drawings.

As shown in FIGS. 1 to 6, a magnetized water generator according to the present invention comprises: a housing portion 100 having a cylindrical structure; a first magnetized water generating unit 200 located on an upper side in the housing portion 100 and rotating in a forward or counter-clockwise direction by water flowing into the housing portion 100 to magnetize water; and, a second magnetized water generating unit 300 located on an intermediate position in the housing portion 100, wherein the second water generating unit 300 is separated from the first magnetized water generating unit 200 by a barrier and wherein the second magnetized water generating unit 300 rotates in a reverse or clockwise direction so as to magnetize the water that has been magnetized by the first magnetized water generating unit 200 and has passed through said barrier.

The housing portion 100 is a case member that provides a space for accommodating the components as described above. The housing portion 100 includes: an upper case 110 that provides an upper space for accommodating the first magnetized water generating unit 200 and that allows water to flow into the upper space from an outside; an intermediate case 120 coupled to a lower part of the upper case 110 and providing an intermediate space for accommodating the second magnetized water generating unit 300 while being separated from the first magnetized water generating unit 200, wherein water magnetized by the first magnetized water generating unit 200 flows from the upper case 110 into the intermediate space; and a lower case 130 coupled to a lower part of the intermediate case 120 and providing a lower space that allows components for producing bubble water to be installed therein, wherein water magnetized by the second magnetized water generating unit 300 flows from the intermediate case 120 into the lower space (if the bubble water producing means is included) or flows outside.

The upper case 110 is a case that provides an upper space in which the first magnetized water generating unit 200 is accommodated. The upper case 110 includes: an upper case body 111 having a cylindrical structure of a trapezoidal cross-section with an open lower surface; an upper opening 112 located at a side surface of the upper case body 111 and allowing water to flow from the outside into the upper space at an oblique angle, more preferably at an angle of 45 degrees so as to cause the first magnetized water generating unit 200 to rotate in the forward or the counterclockwise direction due to hydraulic pressure of water as described below; an upper rotational groove 113 formed as a concave groove which is located at a center of the upper surface in the upper case body 111 and which is configured to allow rotation of the first magnetized water generating unit 200; and, an upper coupler 114 located along a lower periphery of the inner side of the upper case body 111 and allowing the intermediate case 120 to be coupled thereto.

The intermediate case 120 is a case that provides an intermediate space for accommodating the second magnetized water generating unit 300, independently from the first magnetized water generating unit 200 in the upper case 110. The intermediate case 120 comprises: an intermediate case body 121 having a cylindrical structure of a trapezoidal cross-section with an open lower surface; an intermediate coupler 122 formed along an upper periphery of the intermediate case body 121 and detachably coupled to the upper coupler 114 of the upper case 110; a first intermediate rotational groove 123 formed as a concave groove which is located at a center on an upper and outer surface of the intermediate case body 121 and which is configured to allow rotation of the first magnetized water generating unit 200; and, a plurality of intermediate openings 124 formed on an upper and outer surface of the intermediate case body 121 and allowing water to flow from the upper space into the intermediate space at an oblique angle, more preferably at an angle of 45 degrees so as to cause the second magnetized water generating unit 300 to rotate in the reverse or the clockwise direction due to hydraulic pressure of water as described below; a second intermediate rotational groove 125 formed as a concave groove which is located at a center on an upper and inner surface of the intermediate case body 121 and which is configured to allow rotation of the second magnetized water generating unit 300; and, an intermediate coupler 126 located along a lower periphery of the inner side of the intermediate case body 121 and allowing the lower case 130 to be coupled thereto.

The lower case 130 is a case configured in the lower end of the intermediate case 120. The lower case 130 comprises: a lower case body 131 having an cylindrical structure with an open lower surface; a lower coupler 132 formed along an upper periphery of the lower case body 131 and detachably coupled to the intermediate coupler 114 of the intermediate case 120; a lower rotational groove 133 formed as a concave groove which is located at a center on an upper and outer surface of the lower case body 131 and which is configured to allow rotation of the second magnetized water generating unit 300; and, a plurality of lower openings 134 formed on an upper and outer surface of the lower case body 131 and allowing water to flow from the intermediate space into a lower space, so that water is supplied or discharged toward the bubble water producing means, if the bubble water producing means is included.

Here, the lower case 130 may have a coupler for coupling to a separate case for producing bubble water.

Accordingly, the upper case 110 in which the first magnetized water generating unit 200 is configured and the intermediate case 120 in which the second magnetized water generating unit 300 is configured are independently sealed and coupled to each other by the housing portion 100. Therefore, since the magnetized water generating units rotate opposite to each other, it is possible to provide a function of relatively doubling the number of revolution of water and, as a result, the magnetization efficiency of water might be maximized.

That is, the opening through which water flows from the outside into the upper case 110 and the other opening through which water flows from the upper case 110 into the intermediate case 120 are formed to have an angle of about 45 degrees between these openings. Here, since each of the upper case 110 and the lower case 130 has a closed structure, water flows at a higher pressure, and the magnetized water generating units rotate in opposite directions, respectively. For example, when the first magnetized water generating unit 200 rotates in the forward direction at about 30 revolutions per a second and the second magnetized water generating unit 300 rotates in the reverse direction at about 20-30 revolutions per a second, water passing through these magnetized water generating units may have the effect of rotating at about 50-60 revolutions per a second.

By means of the above-described structure of the present invention, water flowing into the housing portion 110 rotates at about 50-60 revolutions per a second, so that water is magnetized while rotating. Thus, it is possible to provide a novel and compact structure that provides the same effect as the conventional structures connected to each other with the number of 50-60, each conventional structure allowing water to simply pass between N and S poles.

The first magnetized water generating unit 200 is located in the upper space formed by the upper case 110, and it is means for magnetizing water in a first stage, while being rotated in the forward or counterclockwise direction by water flowing into the upper space through the upper opening 112. The first magnetized water generating unit 200 comprises: a first rotor 210 located in the upper space of the upper case body 111 and rotating in the forward or counterclockwise direction by water flowing into the upper space through the upper opening 112; and, a first magnetizing member 200 located within the first rotor 210 and rotating while the first rotor 210 rotates, so as to magnetize the water that has been introduced and temporarily stored in the upper space.

The first rotating body 210 comprises: a first rotating body 211 having a flat and cylindrical structure with an open lower surface and providing a space in which the first magnetizing member 220 is mounted and accommodated; first rotating vanes 212 formed on a side of the first rotating body 211 with a constant interval therebetween to protrude in a radial direction and causing the first rotating body 211 to rotate by hydraulic pressure of water, wherein water flows through the upper opening 112; a first upper projection 213 formed on an upper surface of the first rotating body 211 to project therefrom and inserted into the upper rotational groove 113 of the upper case 110 to install the first rotating body 211 in an inner space of the upper case body 111; a first closing case 214 mounted on a lower side of the first rotating body 211, so that the first magnetic member 220 is accommodated in the first rotating body 211; and, a first lower projection 215 formed on a lower surface of the first closing case 214 to project therefrom and inserted into a first intermediate rotating groove 123 of the intermediate case 120, so as to install the first rotational body 210 in an inner space of the upper case body 111.

Here, in order to deliver hydraulic pressure more strongly to a surface of the first rotating vane 212, which is in direct contact with water flowing from the upper opening 112, it is preferable to form a step on the surface of the first rotating vane 212. Accordingly, when the step of the first rotating vane 212 contacts water, water does not slide along the surface of the first rotating vanes 212, but the step causes interference in water flow. As a result, hydraulic pressure of water could be delivered to the first rotating vane 212 without any loss.

The first magnetic member 220 comprises a magnet in the form of a disk or a donut so as to be easily accommodated within the first rotating body 211. For example, the magnetic member may have the N pole and the S pole at its upper and lower parts, respectively; otherwise, it may be divided into four regions to have the poles.

Therefore, the first magnetized water generating unit 200 is rotatably positioned in the upper case 110, and thus, the hydraulic pressure caused by water flowing through the upper opening 112 is delivered to the first rotating vanes 212 of the first rotating body 210 and the first rotating body 210 rotates at a higher speed. Accordingly, the first magnetic member 220 within the first rotating body 210 also rotates at a higher speed, and water introduced into the upper space of the upper case 110 is effectively magnetized in a first stage.

Here, the first magnetic member 220 of the first magnetized water generating unit 200 has a disk or donut shape, and the first magnetic member has the polarities divided into a cross shape or into upper and lower portions. Accordingly, it is possible to simply implement a structure for magnetization by providing a single magnet in the first rotating body 210 and it is possible to generate very complex magnetic field lines within the upper space by means of direct rotation of the first magnetic member 220.

The second magnetized water generating unit 300 is the means for magnetizing water in a second stage, which are located in the intermediate space of the intermediate case 120 to rotate in the reverse or clockwise direction by water flowing into an intermediate space through the intermediate opening 124. The second magnetized water generating unit 300 is located in an intermediate space of the intermediate case body 121. The second magnetized water generating unit 300 comprises: a second rotor 310 rotating in the reverse or clockwise direction by water introduced into the intermediate space through the intermediate opening 124; and, a second magnetizing member 320 located within the second rotor 310 and rotating while the second rotor 310 rotates, so as to magnetize the water that has been introduced and temporarily stored in the intermediate space.

The second rotor 310 comprises: a second rotating body 311 having a cylindrical structure with an open top and an open bottom; a magnet mounting structure 312 formed as a spoke on an inner periphery of the second rotating body 311 and having a cylindrical structure with a open bottom surface, so as to provide a space for accommodating and mounting the second magnetic member 320; second rotating vanes 313 formed to protrude from the upper surface of the magnet mounting structure 312 and allowing the second rotating body 311 to rotate by hydraulic pressure by water flowing through the intermediate opening 124; auxiliary rotating vanes 314 protruding from a side surface of the second rotating body 311 in a radial direction with a regular intervals therebetween and allowing the water that has been introduced into and temporarily stored in the intermediate space to rotate when the second rotating body 311 is rotated; a second upper projection 315 projecting from the upper surface of the magnet mounting structure 312 and inserted into the second intermediate rotating groove 125 of the intermediate case 120 so as to install the second rotating body 311 in the inner space of the intermediate case body 121; a second closing case 316 having a shape corresponding to the cross-sections of the second rotating body 311 and the magnet mounting structure 312, and mounted to lower sides of the second rotating body 311 and the magnet mounting structure 312 so as to allow the second magnet member 320 to be accommodated in the magnet mounting structure 312; and, a second lower projection 317 projecting from the lower surface of the second closing case 316 and inserted into the lower rotating groove 133 of the lower case 130 so as to install the second rotating body 311 in the inner space of the intermediate case body 121.

Here, it is preferable that an edge of the second rotating vane 313 has a curved shape, so as to deliver more powerful hydraulic pressure to the portion of the second rotating vane 313 that is in direct contact with water flowing through the intermediate opening 124. Accordingly, when the edge of the second rotating vane 313 contacts water, water does not slide along the surface of the second rotating vane 313, but the curved shape causes interference in water flow. As a result, hydraulic pressure of water could be delivered to the second rotating vane 313 without any loss.

The second magnetic member 320 comprises a bar or block shape so as to be easily accommodated in the second rotating body 311, i.e., in the magnet mounting structure 312. For example, the magnetic member may have N and S poles at its ends; otherwise, it may have N and S poles at the upper and lower parts, respectively. A block type magnetic member may have N and S poles at its left and right parts, respectively.

Therefore, while the second magnetized water generating unit 300 is rotatably positioned in the intermediate case 120, the hydraulic pressure caused by water flowing through the intermediate opening 124 is delivered to the second rotating vanes 313 of the second rotating body 310, so that the second rotating body 310 rotates at a higher speed. Accordingly, the water that has been introduced into the intermediate space of the intermediate case 120 is magnetized by the second magnetic member 320 located in the second rotor 310, while it rotates at a higher speed.

Here, since the second magnetic member 320 has a rod or block shape, it is possible to use a general magnet, and the second magnetized water generating unit 300 may have a simple structure for magnetization. In addition, as the second magnetic member 320 directly rotates, magnetic field lines may be very complexly generated in the intermediate space.

Figure 1:
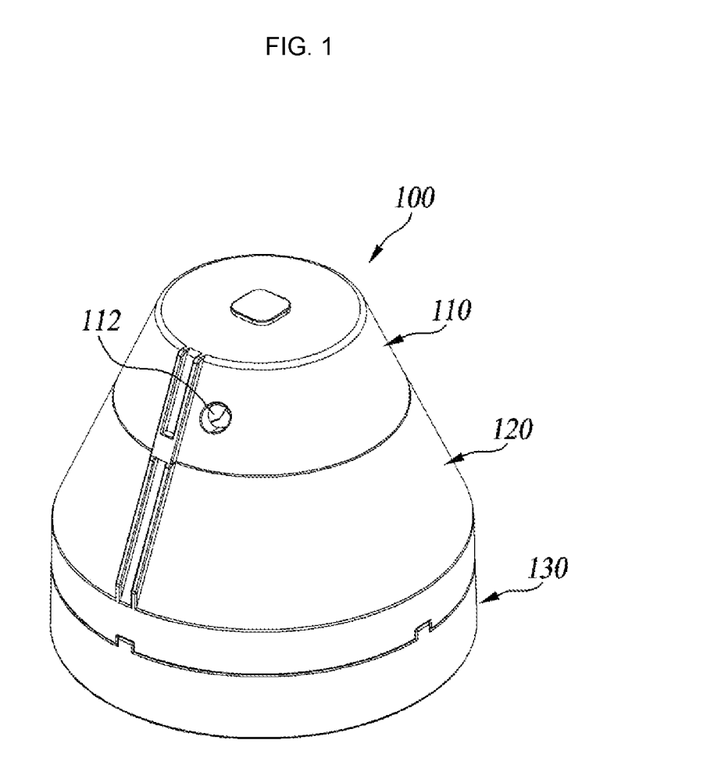
FIG. 1 is a perspective view showing the configuration of a magnetized water generator according to a preferred embodiment of the present invention.
Figure 2:
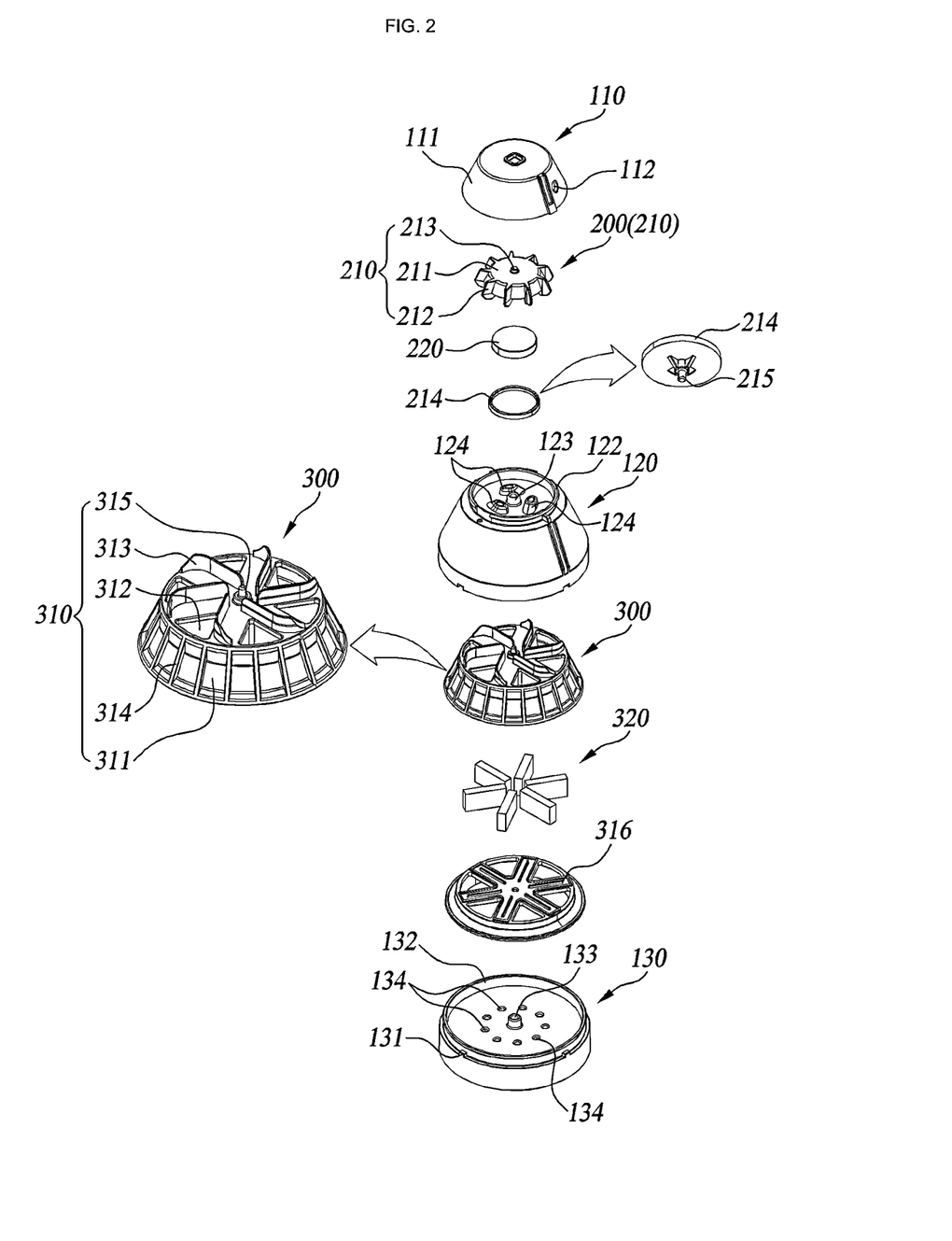
FIG. 2 and FIG. 3 are upper and lower exploded perspective views respectively showing the configuration of the magnetized water generator of FIG. 1.
Figure 3:
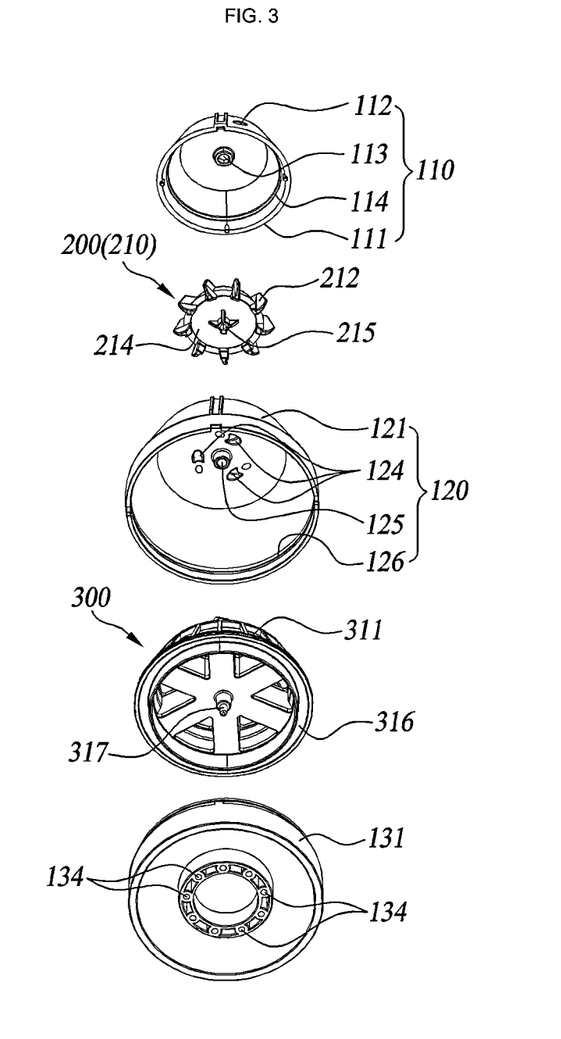
Figure 4:
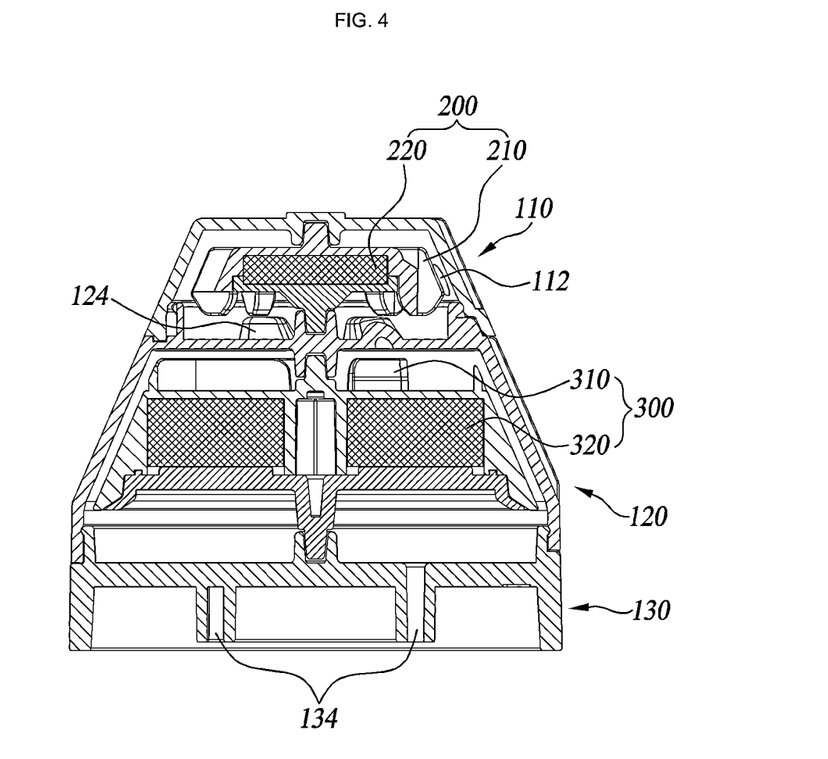
FIG. 4 is a cross-sectional view showing the configuration of the magnetized water generator of FIG. 1; and, FIG. 5 and FIG. 6 are views respectively showing the distribution of magnetic field lines according to rotation of the magnetized water generating unit in the magnetized water generator of FIG. 1.
Figure 5:
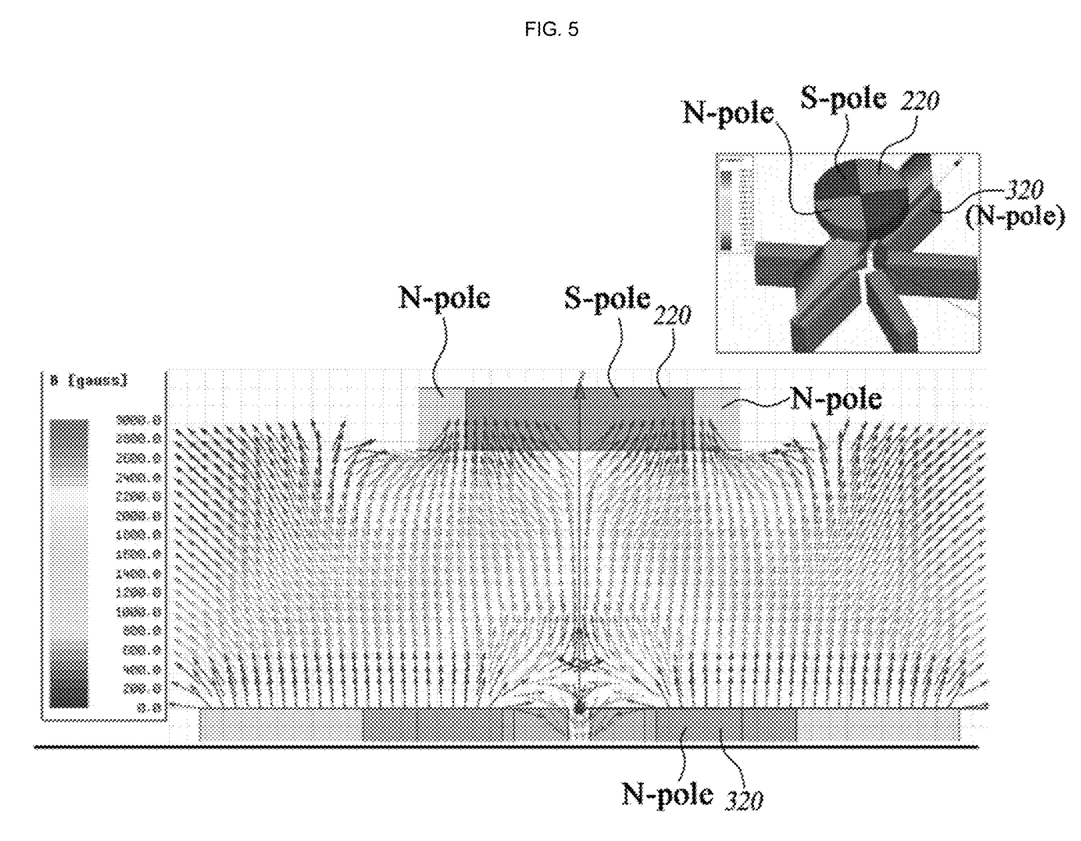
Figure 6:
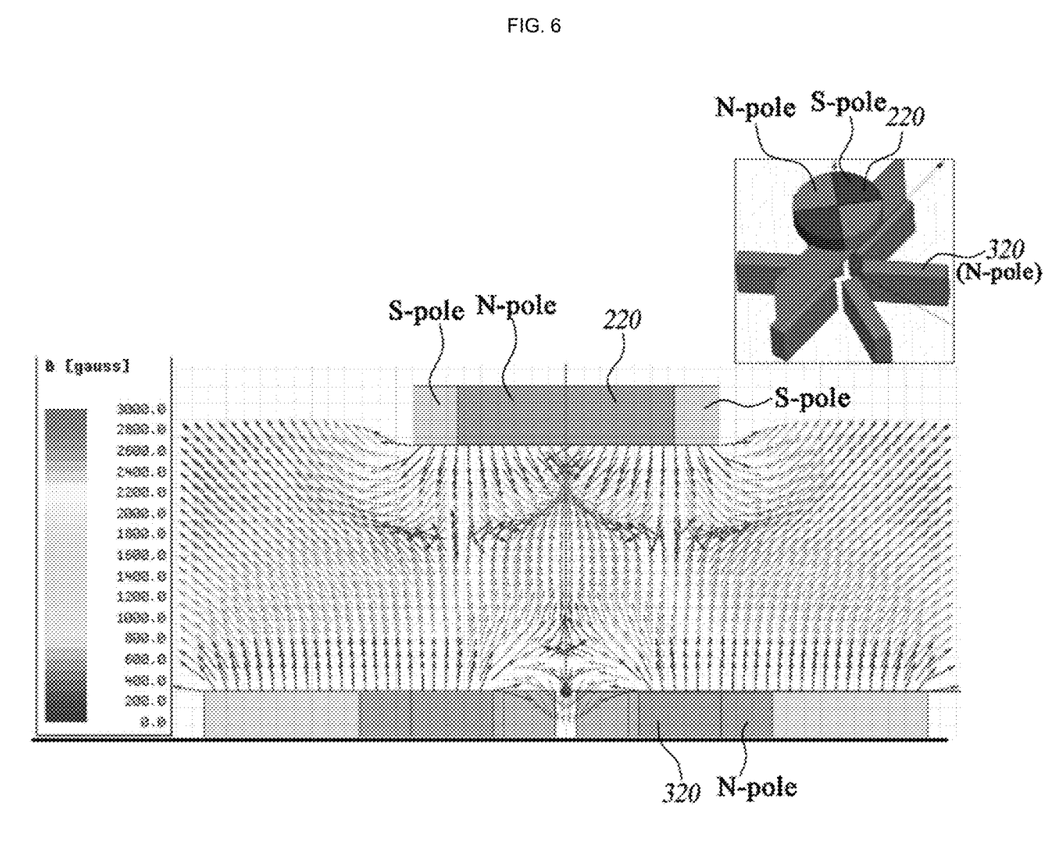

According to the present invention, the first magnetic member 220 of the first magnetized water generating unit 200 rotates in the forward or counterclockwise direction, and the first magnetic member 220 is a magnet having front and back pats or a magnet in the shape of a disk or a donut wherein the magnet has four divisional regions to have N and S poles. Also, the second magnetic member 320 of the second magnetized water generating unit 300 rotates in the reverse or the clockwise direction, and the second magnetic member 320 is a magnet in the shape of a rod or a block, which has the N pole. In such a case, as shown in FIGS. 5 and 6, magnetic field lines are formed in a very complex manner within the space defined between the first magnetic member 220 and the second magnetic member 320, due to repulsive forces between the N poles and attractive forces between the N pole and the S pole. As a result, water molecules located in this space are subject to rotation, translation and vibration owing to the magnetic field lines, so that efficiency in the magnetization and water ionization might be maximized.

Namely, in the magnetized water generator of the present invention, water molecules might be regarded as having electrical characteristics such as an induced electromotive force while passing between the N pole and the S pole, as defined by Fleming's Right Hand Rule in Equation 1 below.

Since the high-speed rotation between N and S poles means that water passes between the magnets in a N multiple in a state of high speed energy, it may be explained or defined as greatly improving the energy level of the magnetized water as defined in Equation 2 below.

$$e = Blv \sin \theta [V] \qquad \text{[Equation 1]}$$

Here, B is the magnetic flux density, v is the speed of movement of the conductor, l is the length of the conductor, and θ is the direction and the angle of movement of the magnetic field and the conductor.

$$e = NBlv \sin \theta [V] \qquad \text{[Equation 2]}$$

Here, N is the number of water rotation, B is the magnetic flux density, v is the speed of movement of the conductor, l is the length of the conductor, and θ is the direction and the angle of movement of the magnetic field and the conductor.

Therefore, for the purpose of the magnetization, the magnetized water generator of the present invention is based on the principle that water molecules become smaller as the hydrogen ions and hydroxide ions undergo separation and recombination processes when water passes through a magnetic field as described above. The energy level is raised by maximizing the coefficient of N through high-speed rotation, thereby refining water molecules to generate a sterilizing effect. Also, It is possible to provide an effect of removing scale or rust of a water pipe or the like.

Hereinafter, the operation of the magnetized water generator having the above-described configuration will be described.

First, the magnetized water generator having the above configuration is stably fitted or mounted in a device such as a shower head.

In this state, water supplied to the inside of the device is introduced into the upper space through the upper opening 112 of the upper case body 111 with a strong hydraulic pressure according to the Bernoulli principle.

Thereafter, the first rotating body 210 of the first magnetized water generating unit 200, which is rotatably positioned inside the upper case 110, rotates in the forward or counterclockwise direction at a higher speed due to hydraulic pressure of water flowing through the upper opening 112. Accordingly, water introduced into the upper space of the upper case 110 is magnetized by the first magnetic member 220 included within the first rotating body 210.

Then, water enters into the intermediate space through the intermediate opening 124 of the intermediate case body 121 with a higher hydraulic pressure by the Bernoulli principle, wherein the water has been magnetized by the first magnetized water generating unit 200 in the upper case 110 in the first stage.

Thereafter, the second rotating body 310 of the second magnetized water generating unit 300, which is rotatably positioned inside the intermediate case 120, rotates in the reverse or clockwise direction at a higher speed due to hydraulic pressure of water flowing through the intermediate opening 124. Accordingly, water introduced into the intermediate space of the intermediate case 120 is magnetized by the second magnetic member 230 included within the second rotating body 310.

Then, water enters into the lower space through the lower opening 134 of the lower case body 121 with a higher hydraulic pressure by the Bernoulli principle, wherein the water has been magnetized by the second magnetized water generating unit 300 in the intermediate case 120 in the second stage.

Here, if there is provided with means for generating bubble water under the lower case body 131, water flowing out of the lower space through the lower opening 134 is generated as bubble water and then it is discharged through the discharge hole 411.

Therefore, as described above, the magnet in the shape of a disk or a donut rotates in the clockwise direction in the upper space, wherein the magnet is magnetized to have the front and rear poles or the multiple poles. The magnets that are arranged to have a spoke shape rotates in the clockwise direction in the intermediate space, wherein the intermediate space is sealably isolated from the upper space and each of the magnets is formed as a rod or a block and is magnetized to have the upper and lower poles or the right or left poles. Thus, magnetic force lines having various sizes and directions are generated between the upper space and the intermediate space, so that the magnetization efficiency of water flowing from the upper space to the intermediate space can be maximized.

In the present invention described above, specific embodiments have been described, but various modifications may be made without departing from the scope of the present invention. Therefore, the scope of the invention should not be defined by the described embodiments, but should be defined by the claims and equivalents of the claims.

The invention claimed is:

1. A magnetized water generator, comprising:
   a housing portion (100) having a cylindrical structure;
   a first magnetized water generating unit (200) located on an upper side in the housing portion (100) and rotating in a forward or counterclockwise direction by water flowing into the housing portion (100) so as to magnetize water; and,
   a second magnetized water generating unit (300) located on an intermediate position in the housing portion (100, wherein the second magnetized water generating unit (300) is separated from the first magnetized water generating unit (200) by a barrier and wherein the second magnetized water generating unit (300) rotates in a reverse or clockwise direction so as to magnetize the water that has been magnetized by the first magnetized water generating unit (200) and has passed through said barrier,
   wherein the housing portion (100) comprises:
   an upper case (110) that provides an upper space for accommodating the first magnetized water generating unit (200) and that allows water to flow into the upper space from an outside;
   an intermediate case (120 coupled to a lower part of the upper case (110) and providing an intermediate space for accommodating the second magnetized water generating unit (300) while being separated from the first magnetized water generating unit (200), wherein water magnetized by the first magnetized water generating unit (200) flows from the upper case (110) into the intermediate space; and
   a lower case (130) coupled to a lower part of the intermediate case (120) and providing a lower space that allows water magnetized by the second magnetized water generating unit (300) to flow from the intermediate case (120) into the lower space,
   wherein the upper case (110) comprises:
   an upper case body (111) having a cylindrical structure with an open lower surface; and,
   an upper opening (112) located at a side surface of the upper case body (111) and allowing water to flow from the outside into the upper space at an oblique angle, so as to cause the first magnetized water generating unit (200) to rotate in the forward or the counterclockwise direction due to hydraulic pressure of water,
   wherein the intermediate case (120) comprises:
   an intermediate case body (121) having a cylindrical structure with an open lower surface; and
   intermediate openings (124) formed on an upper and outer surface of the intermediate case body (121) and allowing water to flow from the upper space into the intermediate space at an oblique angle, so as to cause the second magnetized water generating unit (300) to rotate in the reverse or the clockwise direction due to hydraulic pressure of water,
   wherein the second magnetized water generating unit (300) comprises:
   a second rotor (310) located in an intermediate space of the intermediate case body (121) and rotating in the reverse or clockwise direction by water introduced into the intermediate space through the intermediate opening (124); and
   a second magnetizing member (320) located within the second rotor (310) and rotating while the second rotor (310) rotates, so as to magnetize the water that has been introduced and temporarily stored in the intermediate space, and
   wherein the second rotating body (10) comprises:
   a second rotating body (311) having a cylindrical structure with an open top and an open bottom;
   a magnet mounting structure (312) formed as a spoke on an inner periphery of the second rotating body (311) and having a cylindrical structure with an open bottom surface, so as to provide a space for accommodating and mounting the second magnetizing member (320);
   second rotating vanes (313) formed to protrude from the upper surface of the magnet mounting structure (312) and allowing the second rotating body (311) to rotate by hydraulic pressure by water flowing through the intermediate opening (124); and
   a second closing case (316) having a shape corresponding to the cross-sections of the second rotating body (311) and the magnet mounting structure (312), and mounted to lower sides of the second rotating body (311) and the magnet mounting structure (312) so as to allow the second magnetizing member (320) to be accommodated in the magnet mounting structure (312).

2. The magnetized water generator as claimed in claim 1, wherein the lower case (130) comprises:
   a lower case body (131) having an cylindrical structure with an open lower surface; and,
   lower openings (134) formed on an upper and outer surface of the lower case body (131) and allowing water to flow from the intermediate space into a lower space.

3. The magnetized water generator as claimed in claim 1, wherein the first magnetized water generating unit (200) comprises:
   a first rotor (210) located in the upper space of the upper case body (111) and rotating in the forward or counterclockwise direction by water flowing into the upper space through the upper opening (112); and,
   a first magnetizing member (220) located within the first rotor (210) and rotating while the first rotor (210) rotates, so as to magnetize the water that has been introduced and temporarily stored in the upper space.

4. The magnetized water generator as claimed in claim 3, wherein the first rotor (210) comprises:

a first rotating body (211) having a cylindrical structure with an open lower surface and providing a space in which the first magnetizing member (220) is mounted and accommodated;

first rotating vanes (212) formed on the side of the first rotating body (211) with a constant interval therebetween to protrude in a radial direction and causing the first rotating body (211) to rotate by hydraulic pressure of water, wherein water flows through the upper opening (112); and, a first closing case (214) mounted on a lower side of the first rotating body (211), so that the first magnetizing member (220) is accommodated in the first rotating body (211).

5. The magnetized water generator as claimed in claim 4, wherein each of the first rotating vanes (212) is formed with a step on its surface which is in direct contact with water flowing from the upper opening (112).

6. The magnetized water generator as claimed in claim 4, wherein the first magnetizing member (220) is a magnet in the shape of a disk or a donut.

7. The magnetized water generator as claimed in claim 1, wherein the second rotating vane (313) has a curved shape at its portion that is in direct contact with water flowing from the intermediate opening (124).

8. The magnetized water generator as claimed in claim 1, wherein the second magnetizing member (320) is a magnet in the shape of a bar or a block; and, wherein the second magnetizing member has N and S poles at its ends or N and S poles at its upper and lower parts, respectively.

* * * * *